114-(?)+ 9+
3/31/87 03 -E 32,384

United States Patent [19]
Burchett et al.

[11] E Patent Number: Re. 32,384
[45] Reissued Date of Patent: Mar. 31, 1987

[54] MARINE TETHER ANCHORING DEVICE

[75] Inventors: Clive J. Burchett, Woodlands; Nigel J. Bryant, Fareham, both of England

[73] Assignee: Vickers Public Limited Company, London, England

[21] Appl. No.: 673,442

[22] Filed: Nov. 20, 1984

Related U.S. Patent Documents

Reissue of:
[64] Patent No.: 4,359,960
Issued: Nov. 23, 1982
Appl. No.: 227,013
Filed: Jan. 21, 1981

[30] Foreign Application Priority Data

Jan. 30, 1980 [GB] United Kingdom ..... 8003108
Sep. 15, 1980 [GB] United Kingdom ..... 8029947

[51] Int. Cl.[4] ..... B63B 21/26; F16B 13/06
[52] U.S. Cl. ..... 114/294; 403/297; 405/224
[58] Field of Search ..... 114/293, 294, 297, 230; 403/290, 297; 405/224, 225, 226, 227; 166/209, 212, 221; 294/89, 94, 86.18, 86.15, 86.25; 279/43, 50, 2 A, 2 R

[56] References Cited

U.S. PATENT DOCUMENTS

| | | | |
|---|---|---|---|
| 2,548,096 | 4/1951 | Bryant et al. | 279/2 A |
| 3,638,988 | 2/1972 | Brown | 294/86.18 |
| 4,132,147 | 1/1979 | Contaldo | 403/290 |
| 4,320,993 | 3/1982 | Hunter | 405/224 |

FOREIGN PATENT DOCUMENTS

| | | | |
|---|---|---|---|
| 1348836 | 12/1964 | France | 279/2 |
| 948223 | 1/1964 | United Kingdom . | |
| 1340543 | 12/1973 | United Kingdom | 114/264 |
| 1341373 | 12/1973 | United Kingdom . | |
| 2010431 | 6/1979 | United Kingdom | 114/264 |
| 1572521 | 7/1980 | United Kingdom . | |
| 1583566 | 1/1981 | United Kingdom . | |

*Primary Examiner*—Joseph F. Peters, Jr.
*Assistant Examiner*—Thomas J. Brahan
*Attorney, Agent, or Firm*—Pollock, Vande Sande and Priddy

[57] ABSTRACT

A releasable marine tether connection comprises a tether having a segmented spring collet which can be expanded to become trapped in an anchor chamber. A spigot is provided in the base of the chamber which urges the plug upwards relative to the collet when the tether is pushed into the chamber to make the connection. To release the connection tension is removed from the tether and the plug moved down to allow the spring collet to close and move out of the chamber.

8 Claims, 4 Drawing Figures

MARINE TETHER ANCHORING DEVICE

Matter enclosed in heavy brackets [ ] appears in the original patent but forms no part of this reissue specification; matter printed in italics indicates the additions made by reissue.

BACKGROUND OF THE INVENTION

The invention relates to marine tether anchoring devices.

Various methods are known for fixing tethers of drilling platforms, and the like, in position and it is an object of the present invention to provide an improved marine tether anchoring device which can be released and re-established if necessary and as required.

*The use of marine tethers to connect a marine platform to an anchoring chamber is described in U.S. Pat. No. 4,320,993 (Conoco).*

*U.S. Pat. No. 4,132,147 (Contaldo) discloses in the context of fastening so-called stores to combat aircraft an anchoring device comprising a hollow segmented collet having a passage therethrough and a plug in the passage that is arranged for sliding axial movement relative to the collet between an inoperative position in which the collet is retracted and a working position in which a tapered face of the plug expands the segments of the collet so that the collet cannot pass through the mouth of the anchoring chamber. A protuberant member in the anchoring chamber moves the plug to its working position as the collet travels fully into the base of the anchoring chamber and means is provided for holding the plug in its working position. But apart from the differences of scale and of working environment involved, the Contaldo anchoring device is too complex for marine use and contains essential components such as springs and locking balls that would be prone to corrode in a marine environment and would be inoperable when corroded. Furthermore, in the Contaldo mechanism the collet is fixed to the aircraft and the anchoring chamber has to be pushed upwardly to operate the holding means that keeps the plug in the working position. Such a movable anchoring chamber is manifestly inconsistent with the seabed anchoring chambers taught by Conoco.*

*U.S. Pat. No. 3,638,988 (Brown) teaches a latch assembly for insertion into the bore of the well tool in which a segmented collet is expanded by an internal plug, but no protuberant means is provided for automatically moving the plug to the working position. U.K. Patent Specification Nos. 1583566 (Fermo) and 1572521 (Schafers) show the use of segmented collets in the context of making fixings in pre-drilled holes in masonry or rock.*

SUMMARY OF THE INVENTION

[According to the invention, there is provided a marine tether anchoring device for use with an anchoring chamber comprising a hollow segmented spring collet having adjacent its extreme end an inner enlarged cavity, an intermediate section of diminishing width between said cavity and a hollow passage through said collet, a locking plug extending along said hollow passage and having an end of increased width arranged to be located in said enlarged cavity in a first position, and means for moving said plug between said first position and a second position when said plug engages the intermediate section to open out the collet and provide a securing of the collet in the anchoring chamber.]

*It is an object of the invention to provide an anchor device that can be released and re-established when required and is automatically held in the locked state simply on insertion into the anchoring chamber but is inherently reliable in operation and contains a minimum of essential moving parts.*

*According to the invention there is provided a marine tether anchoring device comprising:*

*(a) an anchoring chamber for fixing to the seabed;*

*(b) means defining a mouth of said anchoring chamber;*

*(c) a hollow segmented collet for attachment to the lower end of said marine tether that can take up a retracted state in which it can pass through said mouth into said anchoring chamber and which can take up an expanded state in which it cannot pass through the mouth of the anchoring chamber and is retained captive therein;*

*(d) means defining a passage through said collet;*

*(e) a plug in said passage arranged for sliding axial movement relative to said collet between an inoperative position and a working position;*

*(f) means defining a tapered face of said plug that cooperates with portions of said passage to expand said collet as said plug moves from its inoperative to its working position;*

*(g) a protuberant member in the anchoring chamber arranged to move the plug to its working position as the collet travels fully into the anchoring chamber; and*

*(h) latch means on the inner faces of the segments of said collet that engage said plug as it is moved into its working position to hold said plug in its working position.*

*The invention further provides a marine tether anchoring device for use with an anchoring chamber having a neck portion, comprising a tether provided with a hollow segmented first spring collet adapted to be inserted into the neck portion of said chamber, said first collet having adjacent its extreme end an inner enlarged cavity, an intermediate section of diminishing width between said cavity and a hollow passage through said first collet, a locking plug extending along said hollow passage and having an end of increased width arranged to be located in said enlarged cavity in a first position, and means for moving said plug between said first position and a second position when said plug engages the intermediate section to open out said first collet and provide a securing of said first collet in the anchoring chamber, said anchoring device further comprising a first slideable sleeve in the neck portion of the anchoring chamber, said first sleeve having a second spring collet, provided with a load ring at its lower end, and which can be expanded to be securely engaged in an uppermost position in said anchoring chamber when tension is applied to the tether, and a second slideable sleeve within said first sleeve and surrounding said hollow segmented first spring collet, said second sleeve extending to a locking ring arranged to engage between said load ring and outer parts of said intermediate section, in which said load ring can be forced outwards to release said locking ring when said first slideable sleeve is in a lowermost position.*

Marine tether anchoring devices according to the invention will now be described.

DESCRIPTION OF THE PREFERRED EMBODIMENT

Figure 1:
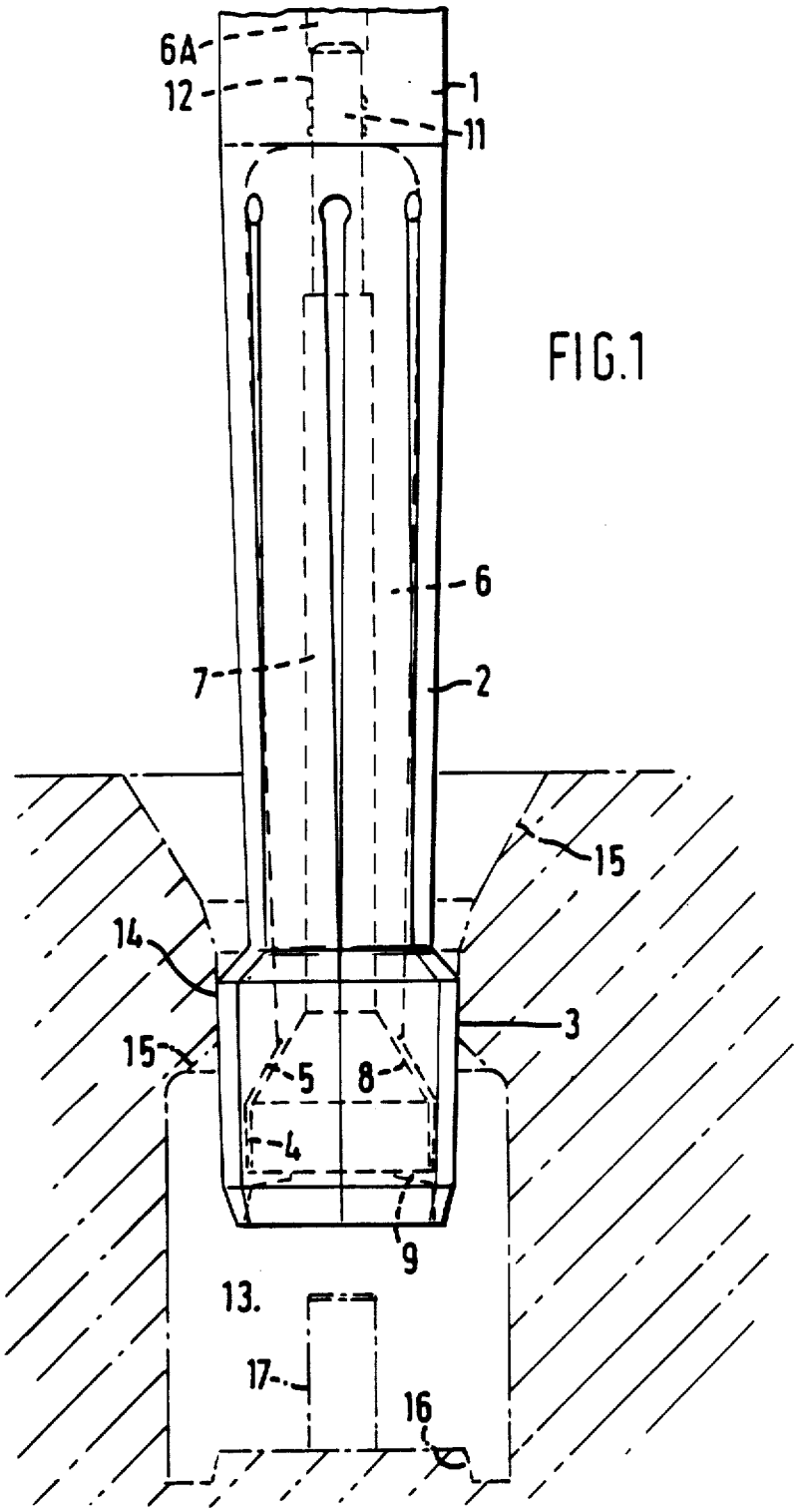
FIG. 1 shows the anchoring device partially entered into an anchoring chamber.

Referring to the drawings, a marine tether 1 is provided with a hollow segmented spring collet 2 which extends from the tether 1 with its outer surface adjacent its extreme end extending outwardly at 3 and to provide within the collet 2 an enlarged cavity 4. An intermediate section 5 between the cavity 4 and a hollow passage 6 of the collet is of frustoconical shape. A locking plug 7 (shown in FIG. 1 in a lowermost or first position in the cavity 4) has a frustoconical portion 8 which fits snugly in the section 5.

A flange 9 at the extreme end of the collet 2 is provided to prevent the locking plug 7 moving out of the collet beyond its first position. A lip 10 (better seen in FIGS. 2 and 3) is provided to resist movement of the plug 7 from a second position, shown in FIGS. 2 and 3, towards the first position. *The collet 2 has resiliently flexible segments on the inner surfaces of which the lip 10 is carried, the resilience of the segments causing the lip 10 defining latch means to snap engage behind the locking plug 7 as the locking plug is moved to the second or working position.* The locking plug 7 is provided with a piston 11 which is entered in a cylinder 12 formed in a hollow passage 6A of the collet extending beyond the locking plug.

The anchoring chamber comprises a chamber portion 13, a neck portion 14 and frustoconical portion 15 between the chamber portion 13 and the neck portion 14. Extending beyond the neck portion 14 there is provided an entry cone 15A. The floor of the chamber is provided with a conical seating 16 and a spigot 17.

Figure 2:
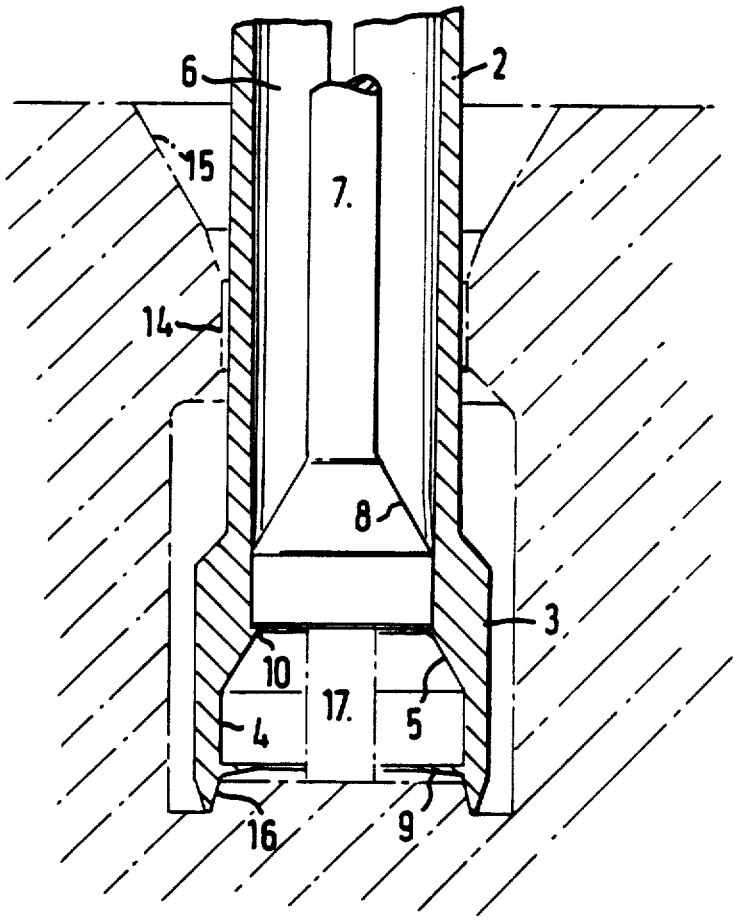
FIGS. 2 and 3 show in section the anchoring device in different relative positions with respect to the chamber.
Figure 3:
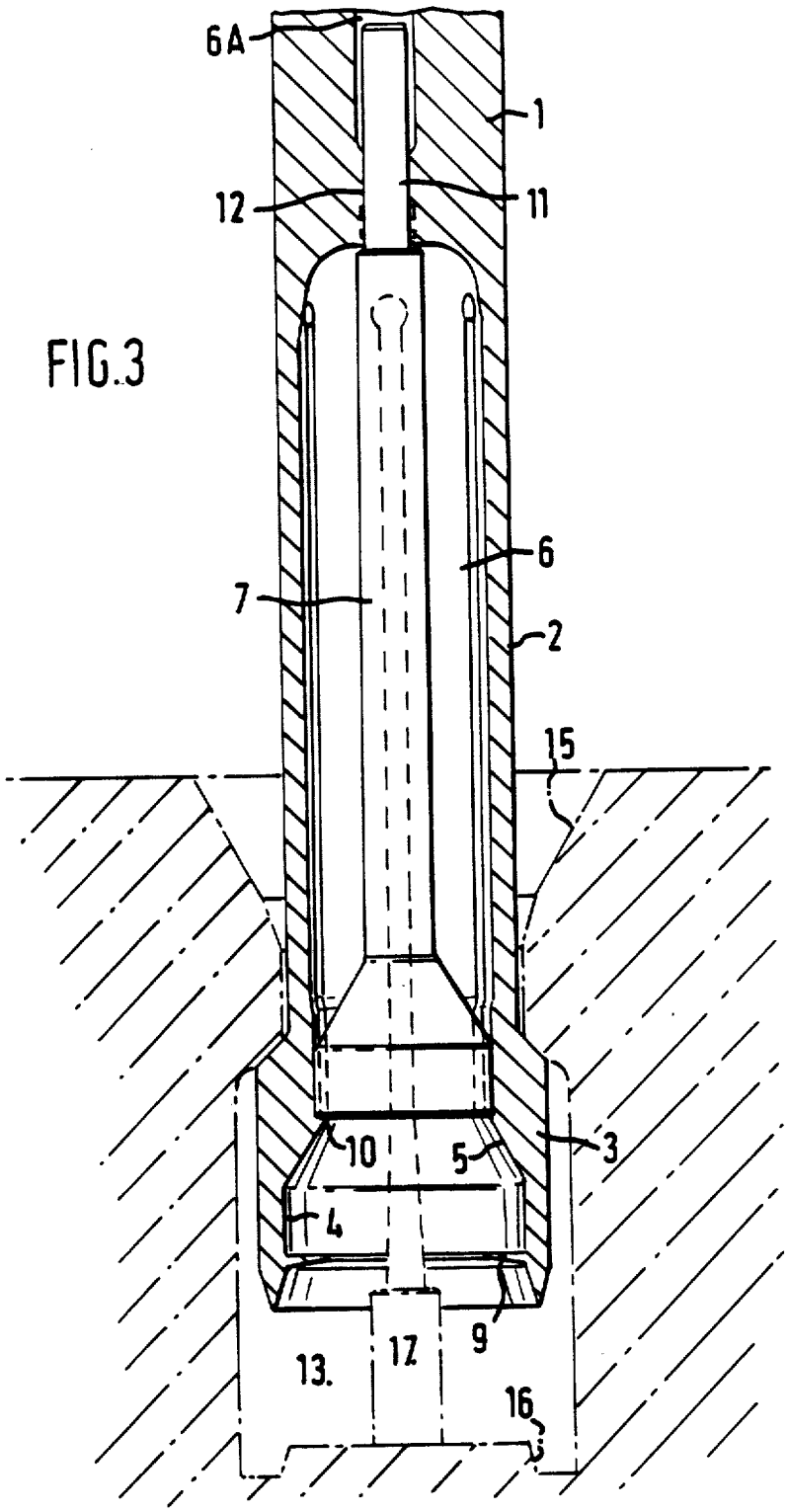

In use, the collet 2 is guided by the cone 15A through the neck portion 14 towards the chamber 13 (FIG. 1). The collet 2 may be compressed to some extent during passage through the neck and it will be noted that the lower edge of the collet 2 is chamfered to help guide the collet 2 into the neck portion 14. The collet 2 is pushed down into the chamber until the spigot 17 engages the end surface of the locking plug 7 and urges it from its first position to its second position (FIG. 2). The locking plug 7 in its second position bears against the surface of the passage 6 and causes the collet to open out. The securing position is shown in FIG. 3 with tension applied to the tether 1 so that the outwardly extending part 3 of the collet 2 is trapped in the anchoring chamber.

In order to release the anchoring device, tension must be removed from the tether and the collet allowed to move towards the floor of the chamber 13. The seating 16 then engages the end of the collet and opens out the collet 2 a little further so that the lips 10 allow locking plug 7 to move under hydraulic pressure applied to the piston 11, towards the floor of the cavity 13 and to its first position. The collet 2 springs back to its closed position and can then be withdrawn through the neck 14 to release the tether 1 from the anchoring chamber.

In the described embodiment, the plug 7 is moved by the spigot 17 from its first to its second position. It will be appreciated that hydraulic, pneumatic or mechanical operative means may be arranged to move the plug 7 from the first to the second position in the absence of a spigot 17 being provided. In the same way, the lip 10 provided in the described arrangement may be dispensed with where plug operative means are provided which locate the plug securely in the second position. Likewise, the flange 9 can be dispensed with if the operative means is arranged to prevent the plug 7 moving beyond said first position.

In another embodiment, the plug 7 is provided with mechanically operative means which in one arrangement comprises a rack mounted on the plug instead of the piston 11 and a pivoted toothed lever mounted on the collet 2 to engage the rack and move the plug between the first and second positions as required.

It will be noted that a marine tether anchoring device according to the invention may for example comprise a collet having a cavity which is generally tapered to narrow from the extreme end of the collet. The plug is arranged to have a tapered end arranged to fit inside the cavity. In its first position the plug 7 is dimensioned and arranged generally as described earlier so that it does not expand the end of the collet. The plug 7 can be moved to its second position and as it moves its outer tapered surface engages the inner tapered surface of the collet cavity to expand the end of the collet. Such an anchoring device can be used with the chamber 13 shown in FIGS. 1 to 3 or if preferred the anchoring device can be used with a generally taper-shaped anchoring chamber. Once the anchoring device is entered fully into a tapered anchoring chamber the plug can be moved from its first position towards its second position until the collet jams in the chamber to form a secure interconnection between the collet and the chamber.

In all embodiments of the invention it will be noted that anchoring devices which are releasable are provided. This means that a drilling platform, for example, can be firmly tethered to anchoring points and readily released as required from time to time and later resecured as desired.

Figure 4:
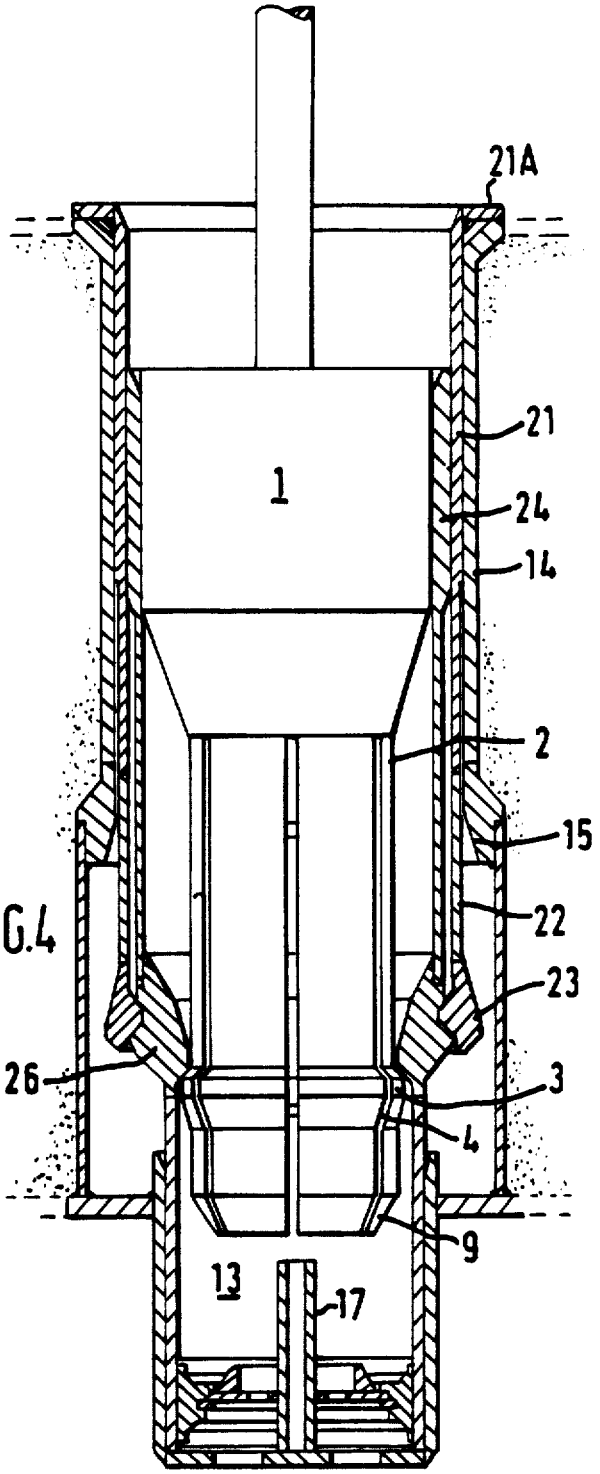
FIG. 4 shows in section a modified arrangement.

In FIG. 4, like numerals are used for like parts of FIGS. 1 to 3. The neck 14 of the chamber 13 is provided with a slidable sleeve 21 extending to a spring collet 22 at its lower end provided with a load ring 23. A second sleeve 24 fits snugly and slidably in the sleeve 21 and surrounds a tether connector 1 at its upper end and carries an intermediate locking ring 26 for engaging the load ring 23 and an outward extending part 3 of the collet 2 of the connector 1. The spigot 17 is supported and fixed to the lower end of the sleeve 24.

In use, the sleeve 21 is inserted into the neck 14 of the chamber, a flange 21A at its upper end limiting downward movement. The sleeve 24 is then slid down into the position shown in FIG. 4. The connector 1 is then lowered into the chamber until the plug 7 (shown in FIGS. 1 to 3) is urged upwardly to expand the spring collet 2. The connector is then raised to the position shown in FIG. 4 where the locking ring 26 engages the part 3. Further upward movement, as tension is applied to the tether, forces both the sleeves 21 and 24 upwards until the load ring 23 engages the portion 15 of the neck 14. The connector is then in its fully locked position.

To release the connector, tension is removed from the tether and the plug 7 lowered (as described with reference to FIGS. 1 to 3) allowing the connector 1 to be withdrawn. In the event this action fails to release the connector, the sleeve 21 is forcibly pushed down (to the position shown in FIG. 4) and held down (by means not shown) and tension then applied to the tether to draw out the connector, together with the sleeve 24, forcing open the collet 22.

The embodiment of FIG. 4, thus provides a secondary release procedure if the primary procedure fails.

It will be noted that various interacting frustoconical shaped surfaces are described. In one or more cases such surfaces may be, for example, generally part-circular in cross-section and/or formed as annuli attached to the lower parts of the plug 7, the spring collet 2 and so on as required to provide the releasable interaction of the various surfaces as described.

We claim:

1. A marine tether anchoring device for use with an anchoring chamber having a neck portion, comprising a tether provided with a hollow segmented first spring collet adapted to be inserted into the neck portion of said chamber, said first collet having adjacent its extreme end an inner enlarged cavity, an intermediate section of diminishing width between said cavity and a hollow passage through said first collet, a locking plug extending along said hollow passage and having an end of increased width arranged to be located in said enlarged cavity in a first position, and means for moving said plug between said first position and a second position when said plug engages the intermediate section to open out said first collet and provide a securing of said first collet in the anchoring chamber, said anchoring device further comprising a first slideable sleeve in the neck portion of the anchoring chamber, said first sleeve having a second spring collet, provided with a load ring at its lower end, and which can be expanded to be securely engaged in an uppermost position in said anchoring chamber when tension is applied to the tether, and a second slideable sleeve within said first sleeve and surrounding said hollow segmented first spring collet, said second sleeve extending to a locking ring arranged to engage between said load ring and outer parts of said intermediate section, in which said load ring can be forced outwards to release said locking ring when said first slideable sleeve is in a lowermost position.

2. A marine tether anchoring device according to claim 1, in which said means for moving said plug between said first and second positions comprises a spigot, said second sleeve extending beyond said locking ring to support and locate said spigot so that it is arranged to move the locking plug from said first position to said second position when the anchoring device is pressed towards the bottom of the anchoring chamber.

*3. A marine tether anchoring device comprising:*

*(a) an anchoring chamber for fixing to the seabed;*

*(b) means defining a mouth of said anchoring chamber;*

*(c) a hollow segmented collet for attachment to the lower end of said marine tether that can take up a retracted state in which it can pass through said mouth into said anchoring chamber and which can take up an expanded state in which it cannot pass through the mouth of the anchoring chamber and is retained captive therein;*

*(d) means defining a passage through said collet;*

*(e) a plug in said passage arranged for sliding axial movement relative to said collet between an inoperative position and a working position;*

*(f) means defining a tapered face of said plug that cooperates with portions of said passage to expand said collet as said plug moves from its inoperative to its working position;*

*(g) a protuberant member in the anchoring chamber arranged to move the plug to its working position as the collet travels fully into the anchoring chamber; and*

*(h) latch means on the inner faces of the segments of said collet that closes behind said plug as it is moved into its working position to hold said plug in its working position.*

*4. The anchoring device of claim 3, wherein said collet has resiliently flexible segments that snap engage said latch means with said plug.*

*5. The anchoring device of claim 4, wherein said collet is formed at its end with a cavity into which said plug fits when in its inoperative position.*

*6. The anchoring device of claim 5, wherein the free end of said cavity is formed with an inwardly projecting flange that prevents removal of said plug.*

*7. An anchoring device according to claim 3, further comprising hydraulic or pneumatic means operable to return said plug from its working to its inoperative position.*

*8. An anchoring device according to claim 3, wherein said anchoring chamber comprises a chamber portion, a neck portion smaller than said anchoring chamber and a frustoconical bearing surface between said chamber portion and said neck portion and the outer surface of said collet segments have protuberant frustoconical portions adapted to abut against said bearing surface when said collet segments are expanded.*

* * * * *